(12) United States Patent
Iwanczyk et al.

(10) Patent No.: US 6,582,539 B2
(45) Date of Patent: Jun. 24, 2003

(54) METHOD FOR MAKING LARGE COMPOSITE STRUCTURES WITHOUT USE OF AN AUTOCLAVE

(75) Inventors: Timothy Dennis Iwanczyk, St. Tammany Parish, LA (US); William John Arbegast, Cheriere, MS (US)

(73) Assignee: Lockheed Martin Corporation, Bethesda, MD (US)

( * ) Notice: Subject to any disclaimer, the term of this patent is extended or adjusted under 35 U.S.C. 154(b) by 106 days.

(21) Appl. No.: 09/877,855

(22) Filed: Jun. 8, 2001

(65) Prior Publication Data

US 2002/0185207 A1 Dec. 12, 2002

(51) Int. Cl.⁷ .............................................. B23K 20/12
(52) U.S. Cl. ...................... 156/73.5; 228/112.1; 228/2.1
(58) Field of Search ................................. 156/73.5, 157, 156/304.1, 304.2, 304.3, 544, 580; 228/112.1, 2.1, 44.3

(56) References Cited

U.S. PATENT DOCUMENTS

| 6,045,027 | A  | * | 4/2000 | Rosen et al. | 228/112.1 |
| 6,193,137 | B1 | * | 2/2001 | Ezumi et al. | 228/112.1 |
| 6,354,483 | B1 | * | 3/2002 | Ezumi et al. | 228/112.1 |
| 6,378,754 | B2 | * | 4/2002 | Aota et al.  | 228/112.1 |
| 6,382,498 | B2 | * | 5/2002 | Aota et al.  | 2287/112.1 |

\* cited by examiner

*Primary Examiner*—James Sells
(74) *Attorney, Agent, or Firm*—Duane Morris LLP

(57) ABSTRACT

A method for fabrication or production of composite structures, which has particular advantages when fabricating large structures, includes the steps of procuring a composite panel, such as carbon-fiber-reinforced resin. The edge of the composite panel its adhesively fixed in the slot of a bifurcated metallic piece. After the composite panel is adhesively fixed to the metallic piece, the metallic piece is stir-friction welded to another metal piece. The stir-friction welding occurs at a lower temperature than fusion welding, and so the adhesive bond between the metallic element and the composite panel is less affected. When two composite panels are each adhesively fastened to a metallic element, the two metallic elements can, in turn, be stir-friction welded. Thus, large panels can be fabricated.

5 Claims, 3 Drawing Sheets

METHOD FOR MAKING LARGE COMPOSITE STRUCTURES WITHOUT USE OF AN AUTOCLAVE

FIELD OF THE INVENTION

This invention relates to the edge fastening of panels or sheets of material, and more particularly to such fastening including both adhesive joints and stir-friction welded joints.

BACKGROUND OF THE INVENTION

The fastening of composite materials to metallic materials or to other composite materials is complicated by the fact that composite materials including thermoset materials or reinforcements cannot, in general, be welded, because the matrix material, being organic, chars rather than melting, and the reinforcing material cannot be raised to a high enough temperature to fuse, without destroying the underlying matrix. Composite materials are very advantageous for many purposes, as they combine high strength with low weight. Practical use of composite materials often requires that they be fastened to other composite structures or to metallic materials.

In general, composite structures can be fastened to other structures by either the use of fasteners or by co-curing. The use of fasteners such as bolts or screws creates differential stresses along the joint, and creates a sealing problem in those cases in which fluids, especially cryogenic fluids, are to be contained. These problems are exacerbated when there is a difference between the temperature coefficients of expansion of the materials being fastened and or of the fastener. One solution for the fastening of composite materials using fasteners is described in U.S. Pat. No. 6,171,009 B1 issued Jan. 9, 2001 in the name of Wright, and another solution is described in U.S. patent application Ser. No. 09/690,964, filed Oct. 18, 2000 in the name of Gudaitis et al.

The use of fasteners can be effective, but the parts count may be high, especially when seals are associated with the fasteners.

Co-curing is a useful method for fastening composites to metallic structures without the need for fasteners. In co-curing, the metallic piece and the uncured composite with its reinforcement (if any) are juxtaposed, and the uncured resin or matrix material is carried onto the surface of the metallic material. The uncured resin is cured, often at high temperatures under vacuum, and becomes integral with both the reinforcement and the metallic material. U.S. Pat. No. 5,441,219, issued Aug. 15, 1995 and U.S. Pat. No. 5,427,334, issued Jun. 27, 1995, both in the name of Rauscher, Jr., describe the fabrication of metal-composite tank structures using co-curing. The combination of high temperature and vacuum conditions for curing often requires the use of an autoclave and special fixtures. Autoclaves cannot be used under all conditions, especially when large assemblages are to be cured. Such large assemblages may be, for example, large fluid storage tanks, the bodies or wings of aircraft, hulls of ships, and the like.

Improved fabrication methods are desired for composite-to-composite and composite-to-metallic joints.

SUMMARY OF THE INVENTION

A method for joining a composite sheet to a metallic sheet includes the step of procuring a composite sheet having a particular thickness, and which defines an edge which is to be fastened to the metallic sheet. An elongated metallic structure is procured. The elongated metallic structure has a cross-section including a common portion or tang and a bifurcation defining a pair of parallel tines. The distal ends of the tines (as seen in cross-section) define an elongated slot in the elongated metallic structure. The elongated slot has a width not less than the thickness of the composite sheet. According to an aspect of the method, the edge of the composite sheet is adhesively fastened into the slot, to make a structural joint between the composite sheet and the elongated metallic structure. The adhesive fastening may be by any kind of adhesive, and in particular the adhesive may be a heat-cured or heat-bonded resin. At this point in the fabrication, the composite sheet is fitted with an elongated metallic edge. The metallic edge of the composite sheet (the common portion of the elongated metallic structure) is stir-friction welded or fused to the metallic sheet. The stir friction welding or fusing occurs at lower temperatures than conventional fusion welding, so the adhesive joint is not likely to be damaged by the welding temperature.

In a particular mode of the method according to the invention, the adhesive fastening step includes the step of placing the edge of the composite sheet into the slot in the elongated metallic structure, followed by the step of injecting adhesive into the region between the slot and the composite sheet. This injection step, of course, may be followed by a heat-curing of the adhesive step, if appropriate.

In another particular mode of the method according to the invention, the step of procuring an elongated metallic structure includes the step of procuring an elongated metallic structure having a cross-section including a common, tang or heel portion and a bifurcation defining a pair of parallel tines and at least one through aperture extending through a tine at a location remote from the distal ends of the tines. The edge of the composite sheet is placed in the slot, and adhesive is then injected through the aperture into at least a portion of the region between the slot and the composite sheet. In another mode of the invention, the step of procuring a sheet of composite material includes the procuration of a planar sheet of composite material.

DESCRIPTION OF THE INVENTION

Figure 1:
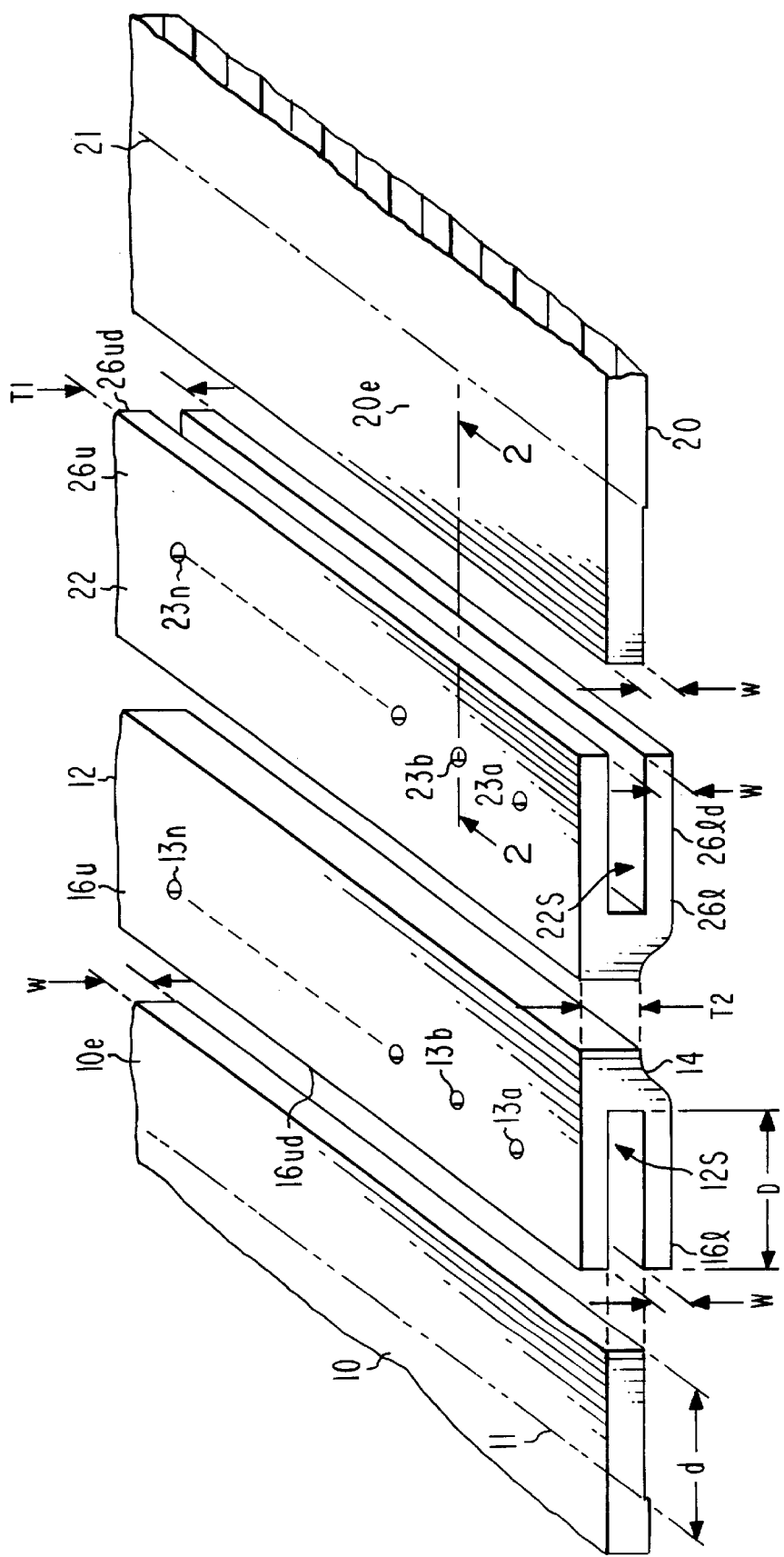
FIG. 1 is a simplified perspective or isometric exploded view of portions of two planar composite panels, each having an edge adhesively fixed to an elongated metallic structure.

In FIG. 1, a first planar composite sheet 10 is associated with a first elongated metallic structure 12, and a second composite sheet 20 is associated with a second elongated metallic structure 22. Metallic structures 12 and 22 may be identical. As illustrated in FIG. 1 and in the cross-section of FIG. 2, metallic structure 12 is shaped, either by machining, casting or extrusion, as a bifurcated structure including a common heel or tang portion 14 and upper and lower tines or strip portions 16u and 16l, respectively. Those distal portions of the upper and lower tines which are most remote from the tang portion 14 are designated 16ud and 16ld, respectively. Upper and lower tine portions 16u and 16l run generally parallel, and define an elongated slot or notch 12S therebetween. The width W of the slot 12S is no less than the thickness w of the edge portion 10e of composite panel 10, and the depth D of slot 12 is at least slightly greater than the width d of edge portion 10e of composite panel 10. Also, metallic structure 22 is in the form of a bifurcated structure including a common heel or tang portion 24 and upper and lower tines or strip portions 26u and 26l, respectively. Those distal portions of the upper and lower tines which are most remote from the tang portion 24 are designated 26ud and 26ld, respectively. Upper and lower tine portions 26u and 26l run generally parallel, and define an elongated slot or notch 22S therebetween. The width of the slot 22S is no less than the thickness of the edge portion 20e of composite panel 20, and the depth of slot 22 is at least slightly greater than the width of edge portion 20e of composite panel 20.

Figure 2:
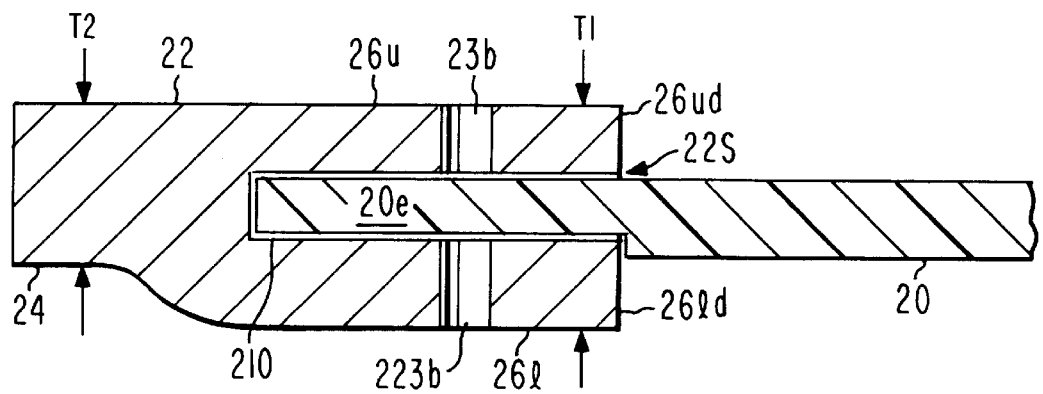
FIG. 2 is a simplified cross-sectional view of a portion of one of the composite panels of FIG. 1, together with its associated metallic structure, in their assembled form, taken at the section lines 2—2 of FIG. 1.

As illustrated in FIG. 2, the edge portion 20e projects into the slot 22S, leaving a slight gap 210 between the edge portion 20e of the panel and the interior of the slot 22S. A pair of apertures 23b and 223b extend through tines or strips 26u and 26l, respectively, to give access to the gap 210, so that the gap can be filled with adhesive. The adhesive itself is illustrated as 312 in FIG. 3.

As illustrated in FIGS. 1 and 2, the edge portions 10e, 20e of the composite panels 10, 20 are of a slightly different thickness than that of the main bodies of the composite panels, so as to emphasize that the panel is required to have a thickness approximately that of the slot width only in the edge portion which protrudes into the slot. Similarly, the vertical dimensions T2 of the heel portions 14 and 24 of the elongated metallic structures 14 and 24 are of different dimensions than the overall outer dimension T1 across the tines or strips 26u, 26l, to emphasize that there is no necessity that these dimensions be equal.

Figure 3:
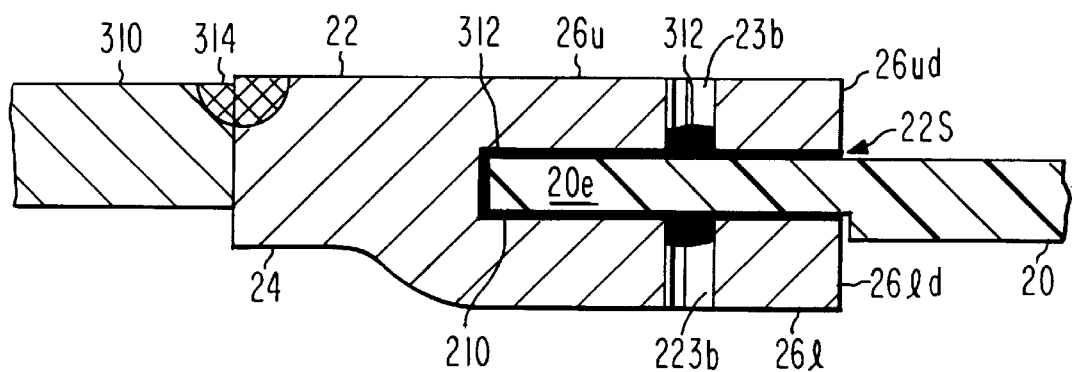
FIG. 3 is a simplified perspective or isometric view of two planar composite panels, each having an edge adhesively fixed to an elongated metallic structure as in FIG. 1, and with the edges of the elongated metallic structures remote from their respective composite sheets welded together.

An edge portion of a composite panel, such as edge portion 20e of panel 20, may be affixed to a metallic sheet or strip by adhesively affixing to the edge portion 20e an elongated furcated or bifurcated metallic structure such as structure 22 of FIG. 1 or 2. This affixation is accomplished by inserting the edge portion 20e into the slot 22S lying between the upper and lower tines or strips 26u and 26l, and then injecting adhesive, such as uncured epoxy resin, into the gap or space 210 by way of one or more apertures such as 23b and 223b of FIG. 2. After the adhesive is cured, if curing is needed, the heel or common portion 24 of the elongated metallic structure is stir-friction welded to the metallic sheet or strip. FIG. 3 is a cross-sectional view similar to that of FIG. 2, showing the adhesive 312 inserted into the gap 210 and remaining within the adhesive-fill apertures 23b and 223b, and with heel or common portion 24 welded to a metal sheet 310 along a line, seen as location 314 in the cross-sectional view. The welding is performed by stir-friction techniques to keep the temperature of the elongated metallic structure 22 lower than the temperatures which would be reached with conventional fusion welding. This, in turn, tends to prevent deterioration of the adhesive bond provided by the adhesive 312 in gap 210.

Naturally, the heel or common portion 24 of the elongated metallic structure 22 of FIG. 1 or 2 can be stir-friction welded to the heel portion of a corresponding composite-metal structure, such as that illustrated in exploded form in FIG. 1. This allows large structures to be fabricated using principally composite materials, without the need for an autoclave large enough to accommodate the entire built-up structure.

Figure 4:
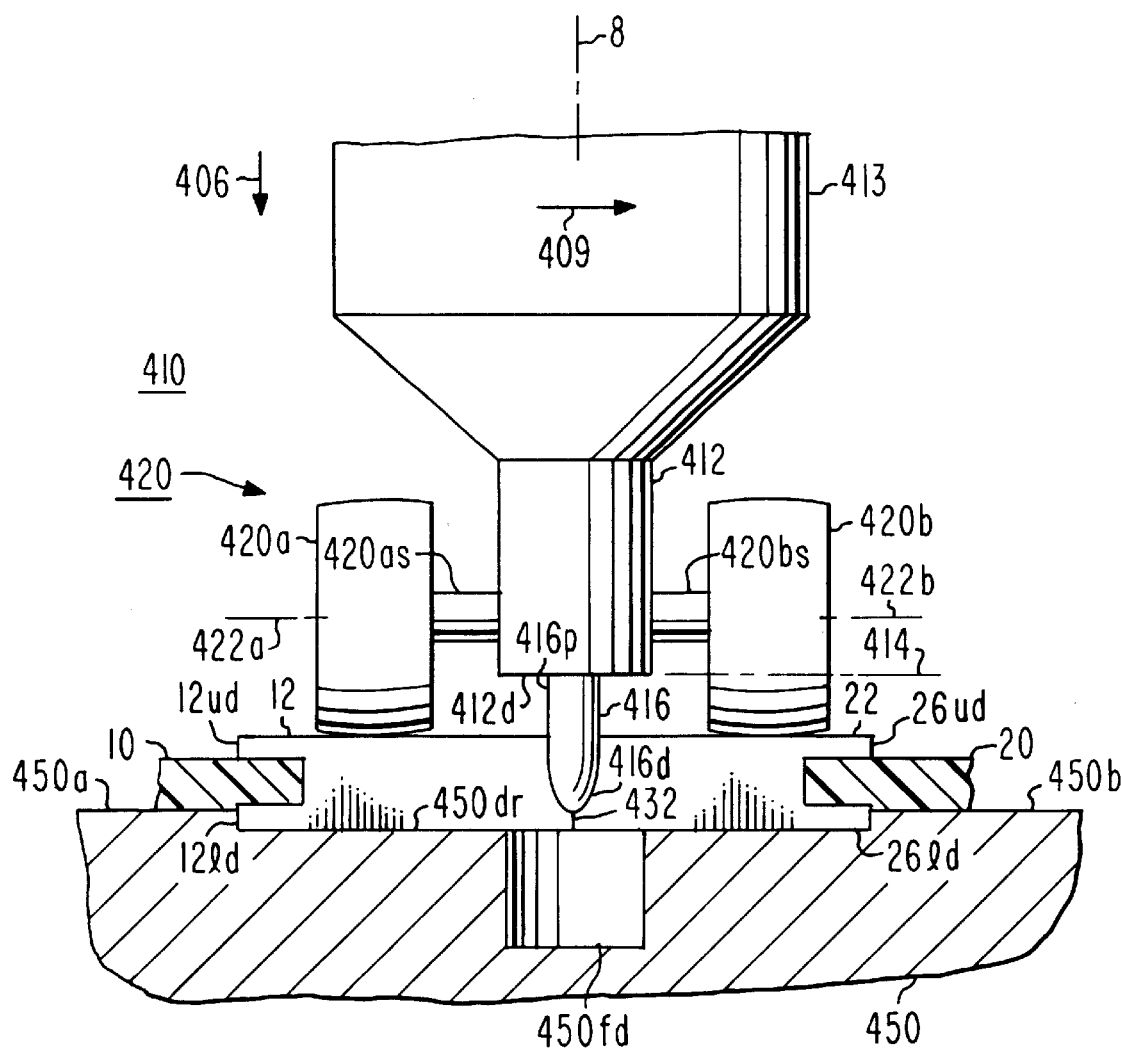
FIG. 4 is a simplified side view of a prior-art stir friction welding apparatus as modified to weld a composite structure in a manner according to the invention.

FIG. 4 is a simplified representation of a stir-friction welding apparatus similar to that described in U.S. Pat. No. 5,971,247, issued Oct. 26, 1999 in the name of Gentry, adapted for making welds of the metallic portions of the structure of FIG. 1. In FIG. 4, elements of the structure corresponding to FIG. 1a of the patent are designated by the same reference numerals, but in the 400 series. Of course, any other stir-friction welding arrangement would also be suitable, but the structure of FIG. 4 has the advantage of aiding in alignment of the structures being welded. In FIG. 4, a stir friction welding head 412 is supported by support element 413, and rotates about an axis of rotation 8. Welding head 412 has a distal end 412d which is contiguous with a plane 414 which is transverse or orthogonal to axis of rotation 8, and supports, in cantilever fashion, the proximal end 416p of a nonconsumable welding post or pin tool 416. Pin tool 416 defines a distal end 416d.

As illustrated, the structure of FIG. 4 also includes a support arrangement or anvil 450 on which the workpiece including metallic elements 12 and 22 is supported. The support arrangement 450 includes left and right upper surfaces 450a and 450b, which support the composite portions 12 and 20, respectively, of the workpiece. The support arrangement 450 also includes a depressed region designated generally as 450dr, which supports the two juxtaposed metallic portions 12 and 20 of the workpiece. Directly under pin tool 416, a further depressed region 450fd provides clearance for those situations in which the pin tool might protrude below surface 450dr. A portion of pin tool 416 of FIG. 4 projects into the gap or seam region 432 lying between juxtaposed metallic elements 12 and 22. Rotation of the welding head 412 in the direction indicated by arrow 409 while applying a force in the direction 406 causes the distal end 416d of the pin tool 416 to plunge into the seam region 432, while stirring the metal. The plunging continues until a stop arrangement 420 including wheels 420a and 420b, supported by axles 420as and 420bs, bear on the upper surfaces of metallic elements 12 and 20. The plunging stops at the illustrated penetration. The workpiece can then be moved relative to the rotating pin tool, in order to form a weld along the seam, as known to those skilled in the art. The depressed region 450dr in the anvil or support 450 of FIG. 4 is dimensioned to accommodate the edges 12ld and 26ld of metallic elements 12 and 20, respectively. The bearing of the edges 12ld and 26ld against the edges of depression 450dr tends to prevent separation of the metallic elements 12 and 20 from each other in response to the forces generated by the plunging pin tool 416, and thus tends to maintain the composite/metal panels in a mutually aligned relationship. As mentioned, the stir-friction welding of the composite-metallic assemblage allows a narrow width of the metal element to be used, without excessive heating of the adhesive joint which might weaken the overall structure. Since the metallic portion can be narrower than if fusion welding were used, the characteristics of the composite material tend to predominate more in the resulting workpiece than if fusion welding were used. This, in turn, provides the method according to the invention to have the potential to produce lighter weight and lower-production-cost composite structures.

Other embodiments of the invention will be apparent to those skilled in the art. For example, the composite panels may be flat or curved, and the associated metallic end pieces should conform to the shape of the edge of the panel to which it is adhesively fixed.

Thus, a method according to an aspect of the invention for joining a composite sheet (20) to a metallic sheet (12; 310) includes the step of procuring a composite sheet (20) having a particular thickness (w), and which defines an edge (20e) which is to be fastened to the metallic sheet (12;310). An elongated metallic structure (22) is procured. The elongated metallic structure (22) has a cross-section (FIG. 2) including a common portion or tang (24) and a bifurcation defining a pair of parallel tines (26u, 26l). The distal ends (26ud, 26ld) of the tines (26u, 26l), as seen in cross-section, define an elongated slot (22S) in the elongated metallic structure (22). The elongated slot (22S) has a width (W) not less than the thickness (w) of the composite sheet (20). According to an aspect of the method, the edge (20e) of the composite sheet (20) is adhesively (312) fastened into the slot (22S), to make a structural joint between the composite sheet (20) and the elongated metallic structure (22;310). The adhesive (312) fastening may be by any kind of adhesive, and in particular the adhesive may be a heat-cured or heat-bonded resin. At this point in the fabrication, the composite sheet (20) is fitted with an elongated metallic edge (22). The metallic edge (22) of the composite sheet (20), or in other words the common portion of the elongated metallic structure, is stir-friction welded (314) or fused to the metallic sheet (310). The stir friction welding or fusing (FIG. 4) occurs at lower temperatures than conventional fusion welding, so the adhesive joint is not likely to be damaged.

In a particular mode of the method according to the invention, the adhesive fastening step includes the step of placing the edge (20e) of the composite sheet (20) into the slot (22S) in the elongated metallic structure (22), followed by the step of injecting adhesive (312) into the region (210) between the slot (22S) and the composite sheet (20). This injection step, of course, may be followed by a heat-curing of the adhesive step, if appropriate.

In another particular mode of the method according to the invention, the step of procuring an elongated metallic structure (22) includes the step of procuring an elongated metallic structure (22) having a cross-section in at least one location which includes a common or tang portion (24) and a bifurcation defining a pair of parallel tines (26u, 26l) and at least one through aperture (23b) extending through a tine at a location remote from the distal ends (26ud, 26ld) of the tines (26u, 26l). The edge (20e) of the composite sheet (20) is placed in the slot (22S), and adhesive (312) is then injected through the aperture (23b) into at least a portion of the region (210) between the slot (22S) and the composite sheet (20).

What is claimed is:

1. A method for joining a composite sheet to a metallic sheet, said method comprising the steps of:

procuring a composite sheet defining an edge which is to be fastened to said metallic sheet, said edge having a particular thickness;

procuring an elongated metallic structure having a cross-section including a common portion and a bifurcation defining a pair of parallel tines, so that the distal ends of said tines of said cross-section define an elongated slot in said elongated metallic structure, said slot having a width no less than said thickness of said edge of said composite sheet;

adhesively fastening said edge of said composite sheet within said slot to form a composite sheet with a metallic edge; and stir-friction welding said common portion of said elongated metallic structure to said metallic sheet.

2. A method according to claim 1, wherein said step of adhesively fastening includes the steps of;

placing said edge of said composite sheet in said slot; and injecting adhesive into the region between said slot and said composite sheet.

3. A method according to claim 2, further comprising the step of curing said adhesive by the use of heat.

4. A method according to claim 1, wherein:

said step of procuring an elongated metallic structure includes the step of procuring an elongated metallic structure having a cross-section including a common portion and a bifurcation defining a pair of parallel tines and at least one through aperture extending through a tine at a location remote from said distal ends of said tines;

placing said edge of said composite sheet in said slot; and injecting adhesive by way of said through aperture into at least a portion of the region between said slot and said composite sheet.

5. A method according to claim 1, wherein said step of procuring a composite sheet includes the step of procuring a planar composite sheet.

* * * * *